(No Model.)  2 Sheets—Sheet 1.
D. R. COTNER.
KITCHEN CABINET.
No. 494,124. Patented Mar. 28, 1893.
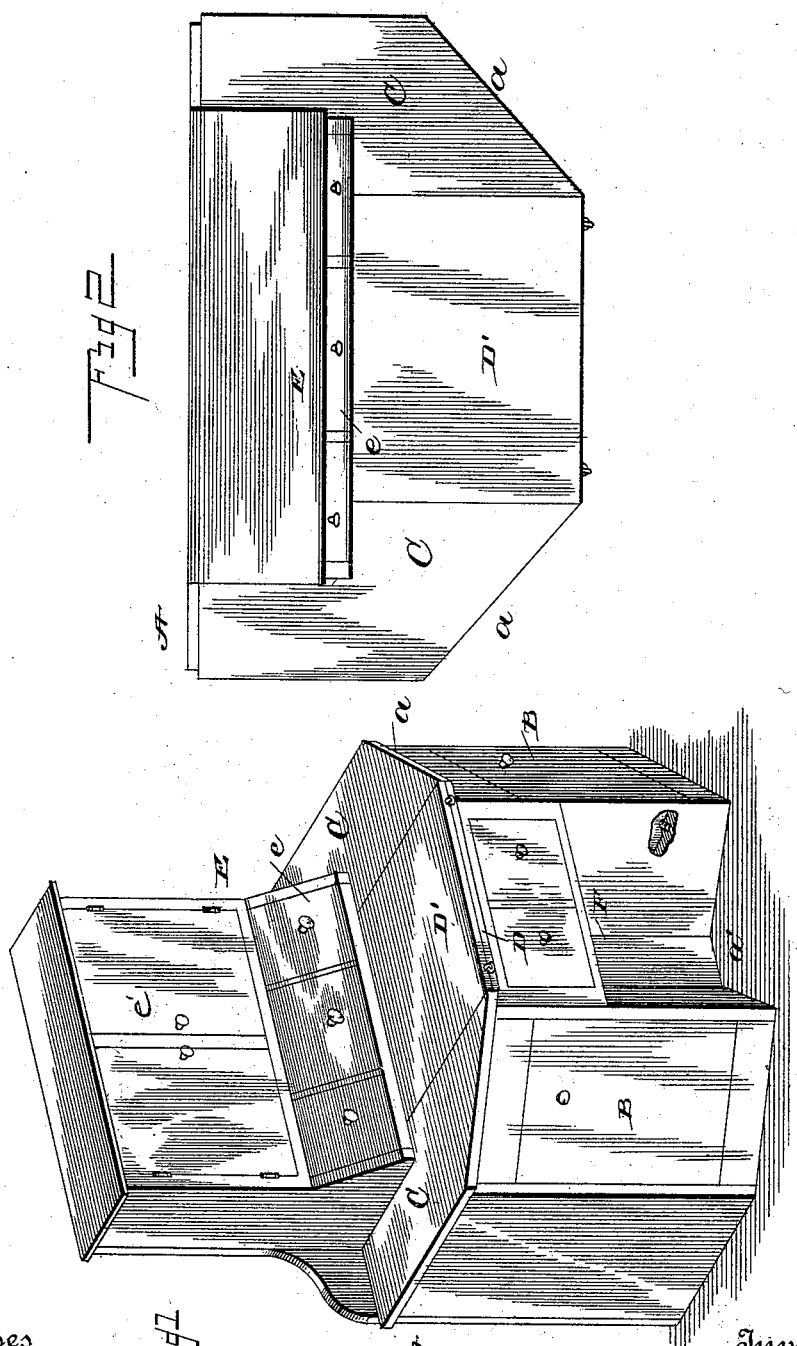
Witnesses  Inventor
John Imrie  David R. Cotner,
 By his Attorney J. R. Littell
THE NORRIS PETERS CO., PHOTO-LITHO., WASHINGTON, D. C.

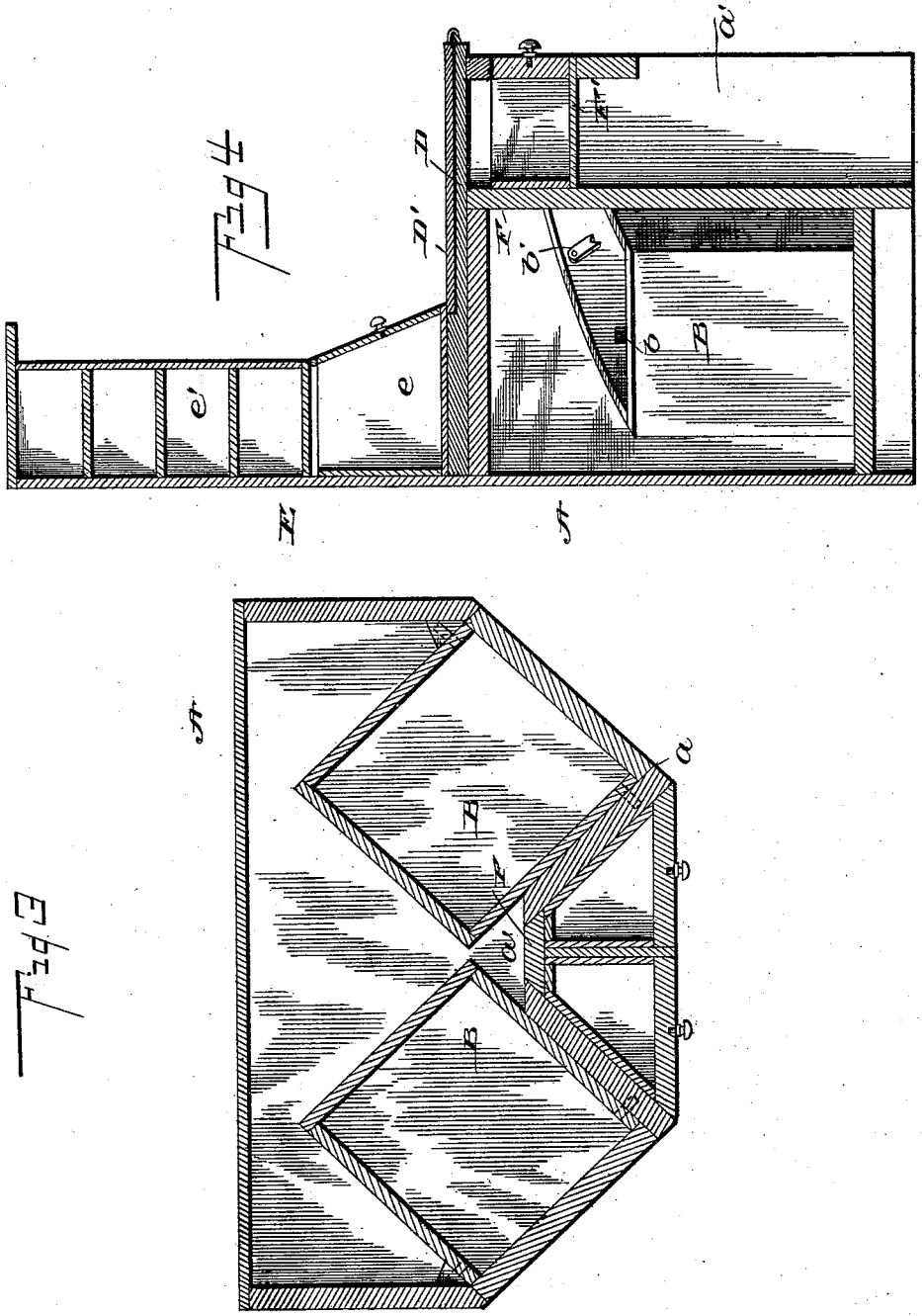

UNITED STATES PATENT OFFICE.

DAVID R. COTNER, OF BARDWELL, KENTUCKY.

KITCHEN-CABINET.

SPECIFICATION forming part of Letters Patent No. 494,124, dated March 28, 1893.

Application filed August 31, 1891. Renewed August 17, 1892. Serial No. 443,330. (No model.)

*To all whom it may concern:*

Be it known that I, DAVID R. COTNER, a citizen of the United States, residing at Bardwell, in the county of Carlisle and State of Kentucky, have invented a new and useful Improvement in Kitchen-Cabinets, of which the following is a specification.

My invention relates particularly to a cabinet adapted to contain flour, meal, &c., and it is the object of my invention to so arrange and construct the several portions of the device that a great deal of space will be afforded for culinary purposes, and yet the cabinet as a whole will occupy very little space.

With these objects in view my invention consists in peculiar construction and arrangement of the various parts, all of which will be hereinafter more fully described and claimed.

In the drawings forming a part of this specification Figure 1 is a perspective view of my improved cabinet. Fig. 2 is a top plan view. Fig. 3 is a horizontal section on the line 3—3 of Fig. 1, and Fig. 4 is a vertical section on the line 4—4 of Fig. 1.

In the practical embodiment of my invention I employ a casing A. the forward corners of which are cut off as at $a$. and the central forward portion constructed with a re-entrant angle $a'$. The cut off corner sides $a$ have each an opening made therein, and in each of said openings is arranged a bin B. said bin being pivoted at its lower forward end, upon horizontal studs arranged at opposite sides of the opening. The tops of the sides of the said bins are curved in the arc of a circle to permit the bins being swung outwardly from the casing. Each bin is provided at its rear end with a stop $b$ to prevent the said bin swinging too far, and to prevent its return unduly I provide a button $b'$. Side boards or pieces C. are secured at each side to the top of the casing, leaving a space between them in which the bread board D slides, and upon the rear portion of the casing, a frame, E. is arranged, said frame extending over the rear ends of the side boards, the rear end of the bread-board being slid beneath the said frame. The lower portion of said frame is provided with a series of drawers, $e$, while the upper part is provided with safe $e'$.

The bread board is provided with a hinged flap or cover, D'. said cover being of thin wood, hinged at the forward end of the board and adapted to be folded over upon the board when the same is slid back beneath the frame E. When the board is in normal position, the inner edge of the cover projects beneath the frame E, and is thus locked upon the board until the latter is partially withdrawn. This cover D' keeps dust and dirt from the board when not in use. When the board is to be used the flap is folded down as clearly shown. A vertical board F extends across the re-entrant angle of the casing, and a horizontal board F' is secured in said angle, and forming with the front board a compartment in which are arranged two drawers, the bread board forming the top of said compartment.

By having the frame constructed with the oblique extensions and bins arranged therein, access can be had to said bins while the bread board is pulled out and in use and space for the operator's feet is also afforded, by the V-shaped recess between the compartments, and it will be found of the greatest value to have the bins upon the side and not beneath the breadboard and yet within easy reach of the operator.

Having thus described my invention, what I claim as new is—

1. In a kitchen cabinet, the combination, with the casing provided with bins, a central recess upon its top, and with a frame partially covering said recess, of a bread-board sliding within the latter and provided at its rear end with an upwardly projecting portion, the latter being in conjunction with the board of approximately the same depth as the recess, and a cover of corresponding thickness to the projecting portion and hinged at the front edge of the board, said cover when in folded position being adapted to enter the recess; substantially as and for the purpose set forth.

2. In a kitchen cabinet, the combination, with the casing provided with obliquely-arranged, swinging bins and with drawers, side boards disposed on the top of the frame at its ends and forming an intermediate recess, and a frame provided with compartments and partially covering said recess, of a bread-board sliding within the latter and having its rear end of increased depth and approximately the same depth as the recess, for the purpose described, and a cover hinged at the outer edge of said board and adapted to fit over the board proper and form a continuation of the deeper rear end of the board, whereby the inner edge of said cover is received within the recess when the board is in closed position; substantially as set forth.

In testimony whereof I affix my signature in presence of two witnesses.

DAVID R. COTNER.

Witnesses:
A. G. McCLURE,
D. N. DODSON.